(12) United States Patent
Haruna

(10) Patent No.: US 11,471,989 B2
(45) Date of Patent: Oct. 18, 2022

(54) SUCTION POSITIONING STRUCTURE AND SUCTION POSITIONING DEVICE

(71) Applicant: KOSMEK LTD., Hyogo (JP)

(72) Inventor: Yosuke Haruna, Hyogo (JP)

(73) Assignee: KOSMEK LTD., Hyogo (JP)

( * ) Notice: Subject to any disclaimer, the term of this patent is extended or adjusted under 35 U.S.C. 154(b) by 0 days.

(21) Appl. No.: 17/047,784

(22) PCT Filed: Apr. 9, 2019

(86) PCT No.: PCT/JP2019/015375
§ 371 (c)(1),
(2) Date: Oct. 15, 2020

(87) PCT Pub. No.: WO2020/017110
PCT Pub. Date: Jan. 23, 2020

(65) Prior Publication Data
US 2021/0107106 A1    Apr. 15, 2021

(30) Foreign Application Priority Data
Jul. 19, 2018    (JP) .............................. JP2018-136218

(51) Int. Cl.
*B23Q 3/18*    (2006.01)
*B25J 15/06*    (2006.01)
(Continued)

(52) U.S. Cl.
CPC ............ *B23Q 3/18* (2013.01); *B25J 15/0616* (2013.01); *B23Q 3/088* (2013.01); *B23Q 7/04* (2013.01); *B23Q 2703/04* (2013.01)

(58) Field of Classification Search
CPC ....... B25B 11/00; B25B 11/005; B25B 11/02; B25J 15/06–0691
(Continued)

(56) References Cited

U.S. PATENT DOCUMENTS 7,922,158 B2 *  4/2011  Fredrickson .............. B25B 1/20
                                                        269/910
9,765,801 B2    9/2017  Cho

FOREIGN PATENT DOCUMENTS

EP    2745987 A2    6/2014
JP    4562832 B2    10/2010
(Continued)

OTHER PUBLICATIONS

International Search Report cited in corresponding Appln. PCT/JP2019/015375 dated Jun. 11, 2019.
(Continued)

*Primary Examiner* — Joseph J Hail
*Assistant Examiner* — Jonathan R Zaworski
(74) *Attorney, Agent, or Firm* — Bacon & Thomas, PLLC

(57) ABSTRACT

An embodiment of the present invention simplifies the configuration of a suction positioning device. An embodiment of the present invention includes: an output rod (3) having an air discharge passage (11); a sleeve (4) which has a tapered outer circumferential surface (12) and is elastically deformable so as to have a reduced diameter; a transmission member (5) having a tapered inner circumferential surface (13); a plurality of balls (B) which are inserted between the tapered inner circumferential surface (13) and the tapered outer circumferential surface (12); and a suction pad (7) attached to the output rod (3) so as to communicate with the air discharge passage (11).

10 Claims, 7 Drawing Sheets

(51) Int. Cl.
*B23Q 3/08* (2006.01)
*B23Q 7/04* (2006.01)

(58) Field of Classification Search
USPC .......................................... 269/21, 20, 289 R
See application file for complete search history.

(56) References Cited

FOREIGN PATENT DOCUMENTS

| JP | 2014008598 A | * | 1/2014 | ............. | B23Q 1/009 |
| JP | 2014030892 A | * | 2/2014 | ............. | B25B 5/061 |
| WO | WO-2005102616 A1 | * | 11/2005 | .......... | B25J 19/0004 |

OTHER PUBLICATIONS

EESR cited in European Application No. 19838034.7 dated Jan. 3, 2022.

* cited by examiner

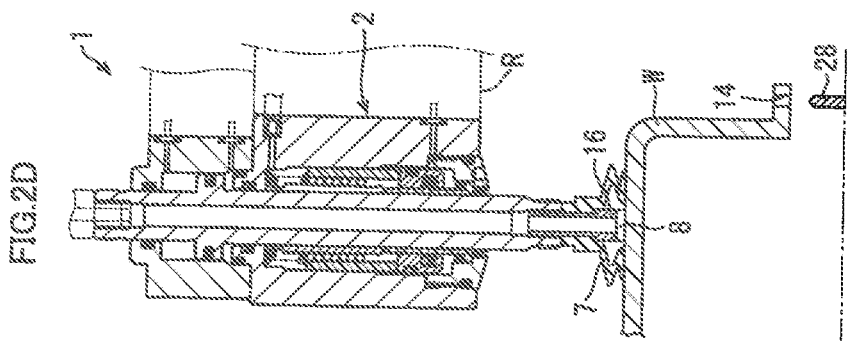
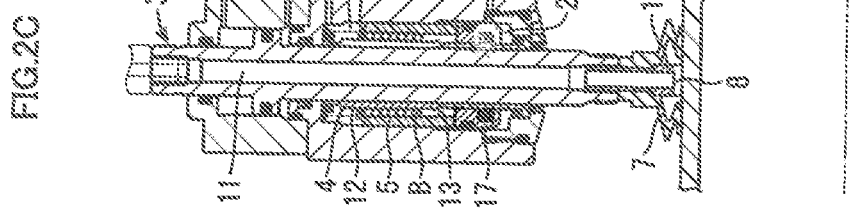
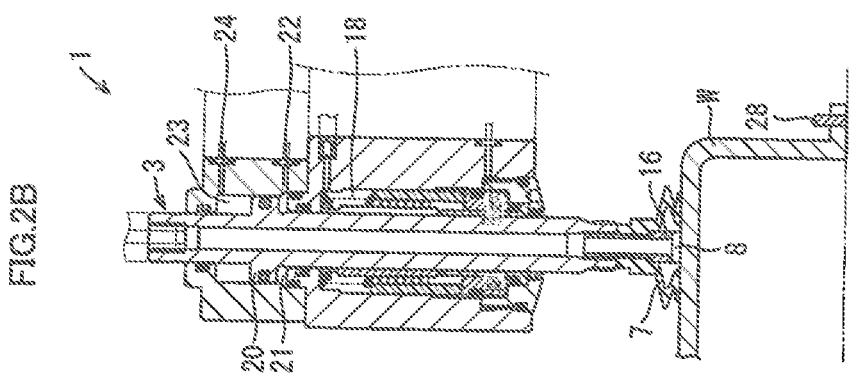
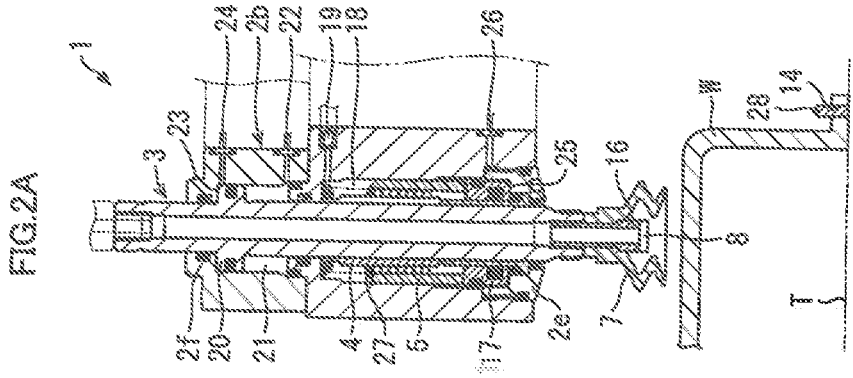

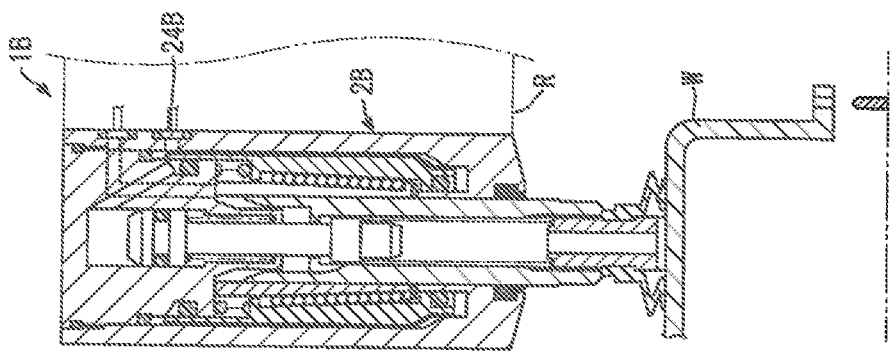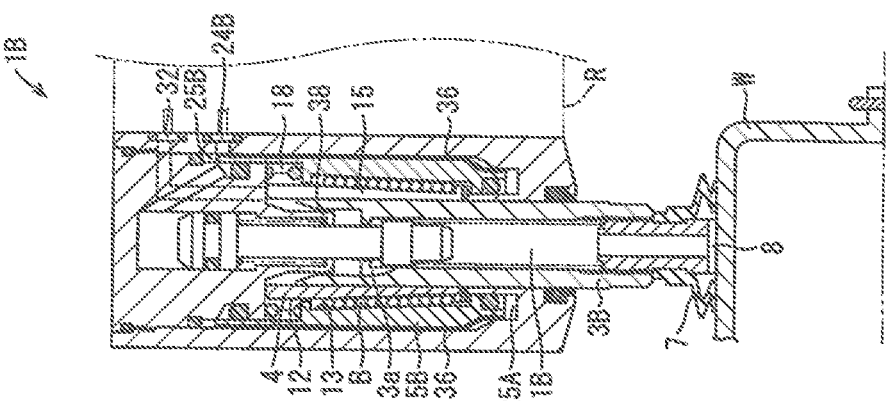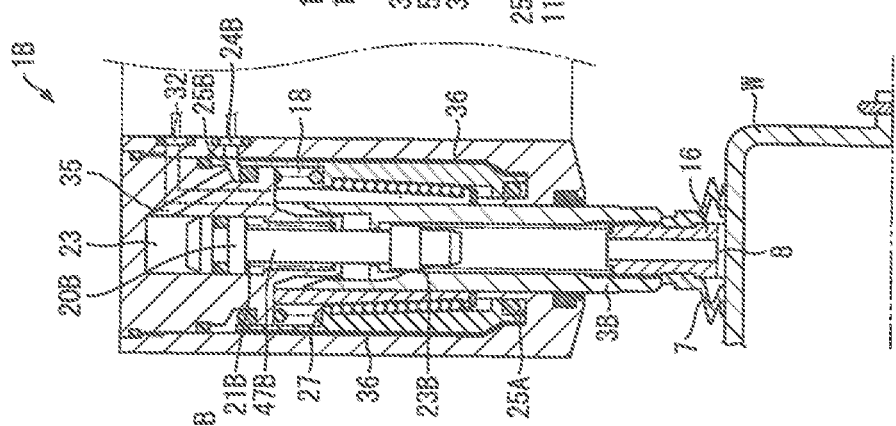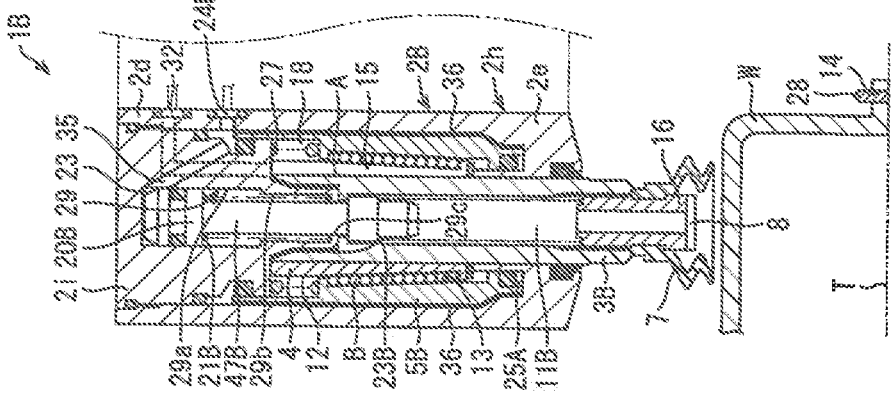

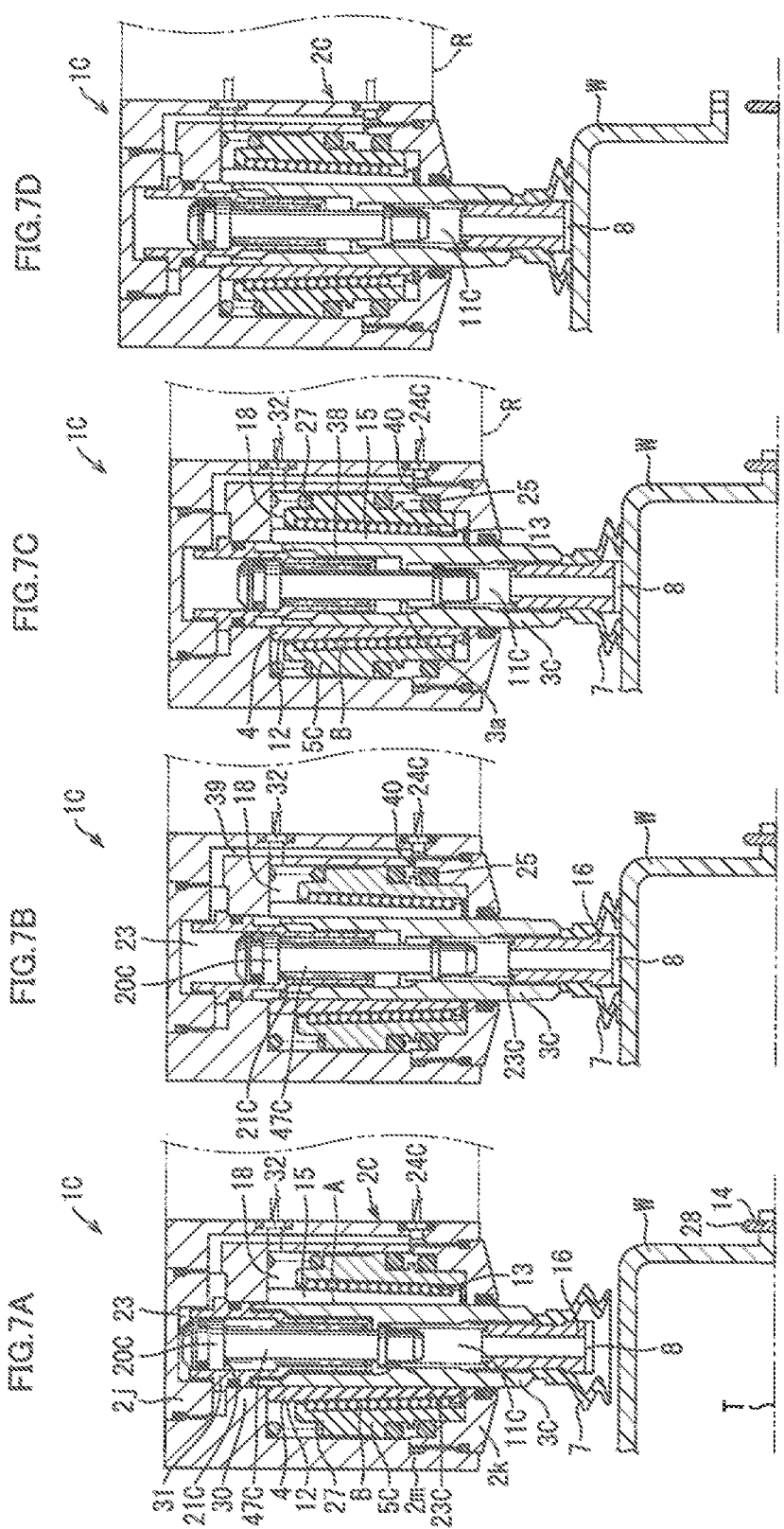

SUCTION POSITIONING STRUCTURE AND SUCTION POSITIONING DEVICE

TECHNICAL FIELD

The present invention relates to a suction positioning device for suctioning and positioning a workpiece to be machined.

BACKGROUND ART

In conventional art, there is known a suction positioning device for suctioning and transferring a workpiece and for fixing the workpiece during processing, specifically, a workpiece such as a metal plate, glass, or carbon fiber reinforced plastic (CFRP) products that are subjected to bending or pressing and have curved surfaces or a non-flat shape (Patent Literature 1).

Such a suction positioning device is mounted at the end of a robot. The suction positioning device has a housing from which a suction member projects upward. An annular piston is inserted into the housing so as to be movable in a vertical direction. The piston has an outer circumferential wall which is tapered so as to be narrower further downward. Outward of the outer circumferential wall of the piston, positioning pins are provided at predetermined intervals in a circumferential direction. The positioning pins are movable in the vertical direction with respect to the housing, and are biased upward by an advancement spring. Sleeves are fitted onto the positioning pins. The sleeves can be reduced in diameter elastically by an external force. The sleeves each have a tapered outer circumference surface that contacts the tapered surface of the piston.

When the suction positioning device is used to suction and fix a thin, plate-like workpiece having a complex shape, the suction member is moved by a robot to a position so as to come into contact with the workpiece. At this time, the positioning pins retract so as to follow the shape of the workpiece. Next, the piston is moved downward so as to cause the sleeves to be reduced in diameter. This causes the inner circumferential surfaces of the sleeves to engage the outer circumferential surfaces of the positioning pins. In this way, the workpiece is suctioned and fixed by the suction member and the positioning pins.

CITATION LIST

Patent Literature

[Patent Literature 1]
Specification of European Patent Application Publication No. 2745987

SUMMARY OF INVENTION

Technical Problem

However, in conventional art such as that above, the following members are provided separately: the suction member which is moved by the robot; and the positioning pins which are movable in the vertical direction with respect to the housing. As such, there is the problem that a suction positioning device for suctioning and positioning a workpiece to be machined has a complex configuration.

An object of an aspect of the present invention is to simplify the configuration of a suction positioning device for suctioning and positioning a workpiece to be machined.

Solution to Problem

In order to solve the above problem, a suction positioning device in accordance with an embodiment of the present invention is configured for example as follows, as illustrated in FIGS. 1 to 3D, FIGS. 4 to 5D, and FIGS. 6 to 7D.

The suction positioning device includes: an output rod 3, 3B, 3C which is supported by a housing 2, 2B, 2C so as to be movable in an axis direction, the output rod 3, 3B, 3C having an air discharge passage 11, 11B, 11C, provided so as to extend in the axis direction, for suctioning a workpiece W to be machined, the housing 2, 2B, 2C being provided to be attached to a robot arm; a sleeve 4 fitted onto the output rod 3, 3B, 3C, which sleeve 4 has a tapered outer circumferential surface 12 and is elastically deformable so as to have a reduced diameter; a transmission member 5, 5B, 5C which is inserted into the housing 2, 2B, 2C and has a tapered inner circumferential surface 13 that faces the tapered outer circumferential surface 12 of the sleeve 4; a plurality of balls B inserted between the tapered inner circumferential surface 13 and the tapered outer circumferential surface 12; and a suction pad 7 for suctioning the workpiece W, which suction pad 7 is attached to the output rod 3, 3B, 3C so as to communicate with the air discharge passage 11, 11B, 11C.

The above aspect of the present invention has the following effects.

The sleeve is elastically deformed to have a reduced diameter, so as to position the output rod in the vertical direction with respect to the housing. The output rod, which has been positioned thusly, suctions the workpiece via the air discharge passage formed inside the output rod. This makes it possible to position and suction the workpiece with use of the output rod. As such, unlike the above conventional art, it is unnecessary to separately provide (i) a suction member which is moved by a robot and (ii) a positioning pin which is movable in the vertical direction with respect to the housing. As a result, it is possible to simplify the configuration of the suction positioning device for suctioning and positioning the workpiece to be machined.

Embodiments of the present invention can include the following preferable configuration.

The workpiece W can be a plate-like member to be machined, and can have a positional displacement preventing part 14 for the workpiece W from being positionally displaced.

In such a case, it is possible achieve accurate horizontal positioning for machining of a plate-like member, which is prone to flexing.

Embodiments of the above invention can include, for example, the following preferable configuration as illustrated in FIG. 1, FIGS. 2A to 2D, FIG. 4, FIGS. 5A to 5D, FIG. 6, and FIGS. 7A to 7D.

The suction positioning device can further include a seating part 8 which is attached to a side, closer to the workpiece (W), of the air discharge passage 11, 11B, 11C of the output rod 3, 3B, 3C so as to be able to come into contact with the workpiece W.

In such a case, it is possible to reliably suction the workpiece by carrying out suctioning while the seating part is in contact with the workpiece.

Embodiments of the above invention can include, for example, the following preferable configuration as illustrated in FIGS. 1 to 3D.

The suctioning positioning device can further include a driving member (locking piston) 17 which moves the transmission member 5 in the axis direction, so as to elastically deform the sleeve 4 via the plurality of balls B such that the sleeve 4 has a reduced diameter.

In such a case, the sleeve can be easily elastically deformed so as to have a reduced diameter, thereby positioning the output rod.

Embodiments of the above invention can include, for example, the following preferable configuration as illustrated in FIGS. 4 to 5D and FIGS. 6 to 7D.

The suctioning positioning device can further include a locking operation chamber 25 into which compressed air is supplied, the compressed air acting on an annular pressure-receiving surface of the transmission member 5B, 5C so as to move the transmission member 5B, 5C in the axis direction.

In such a case, the transmission member can be easily moved in the axis direction so as to elastically deform the sleeve such that the sleeve has a reduced diameter.

Advantageous Effects of Invention

An aspect of the present invention makes it possible to simplify the configuration of a suction positioning device for suctioning and positioning a workpiece to be machined.

BRIEF DESCRIPTION OF DRAWINGS

FIGS. 2A to 2D are diagrams for explaining the operation of the suction positioning device according in accordance with Embodiment 1.

FIGS. 5A to 5D are diagrams for explaining the operation of the suction positioning device according in accordance with Embodiment 2.

FIGS. 7A to 7D are diagrams for explaining the operation of the suction positioning device according in accordance with Embodiment 3.

DESCRIPTION OF EMBODIMENTS

The following description will discuss embodiments of the present invention in detail.

Embodiment 1

Figure 1:
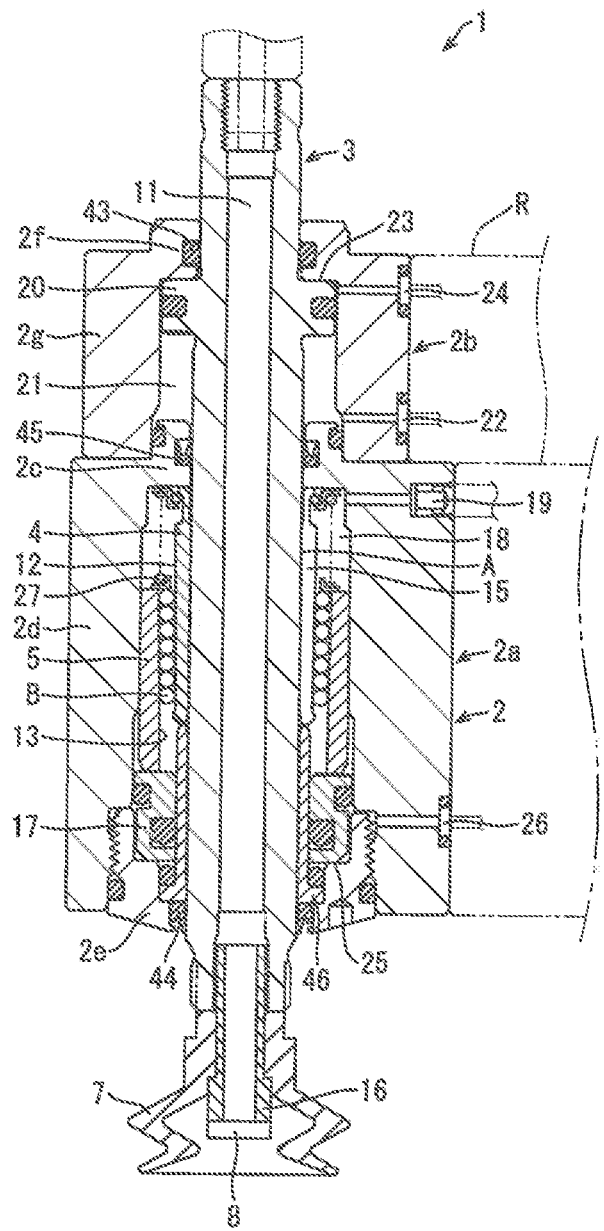
FIG. 1 is a front cross-sectional view of a suction positioning device in accordance with Embodiment 1.
Figure 3A:
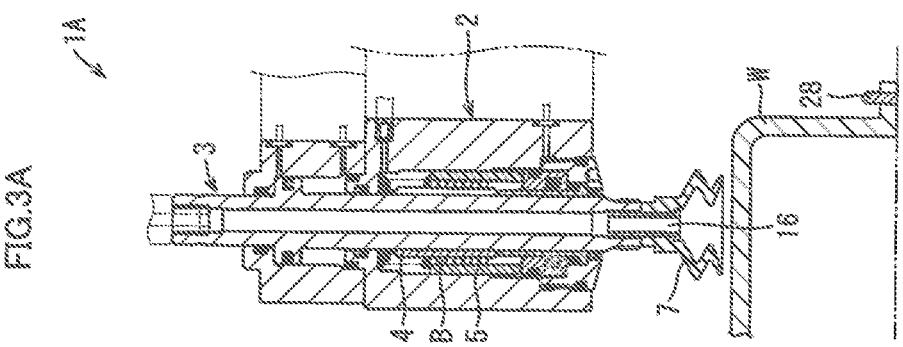
FIGS. 3A to 3D are diagrams for explaining the operation of the suction positioning device in accordance with a variation of Embodiment 1.
Figure 3B:
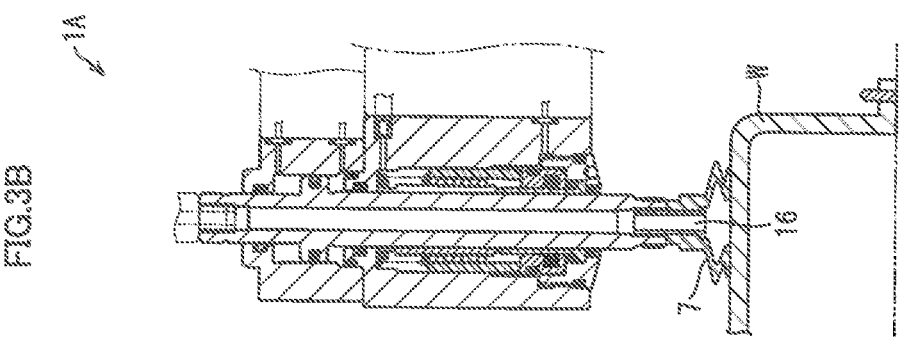
Figure 3C:
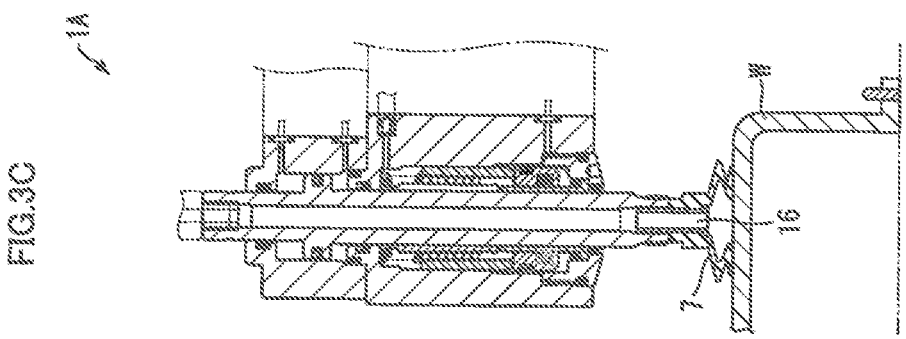
Figure 3D:
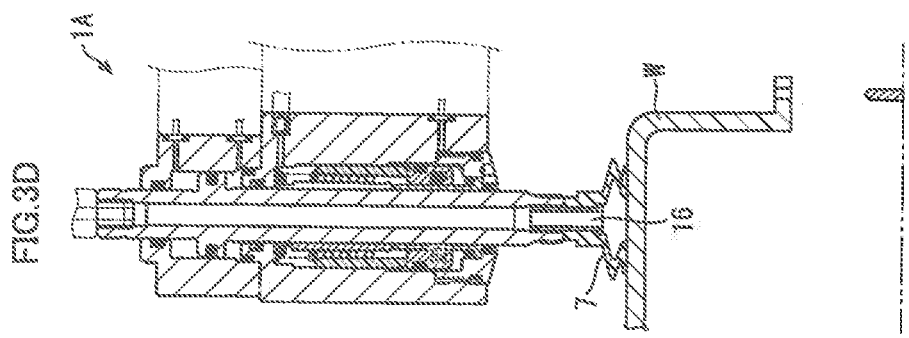

The following description will discuss Embodiment 1 of the present invention with reference to FIGS. 1 to 2D. FIG. 1 is a front cross-sectional view of the suction positioning device 1. FIGS. 2A to 2D are diagrams for explaining the operation of the suction positioning device 1.

(Configuration of the Suction Positioning Device 1)

A housing 2 of the suction positioning device 1 has a lower housing 2a and an upper housing 2b. The lower housing 2a has an upper end wall 2c, a lower end wall 2e, and a barrel part 2d. The upper housing 2b has an upper end wall 2f and a barrel part 2g. The housing 2 is attached to an arm R of a robot by a plurality of fastening bolts (not illustrated).

An output rod 3 is supported by the housing 2 so as to be movable in a vertical direction. The output rod 3 has an air discharge passage 11 formed in the vertical direction. The air discharge passage 11 is for suction of a workpiece W placed on a table T. The output rod 3 is connected to an air discharge mechanism (not illustrated) for discharging air in order to suction the workpiece W.

The output rod 3 is inserted into (i) a cylindrical member 46 attached to the lower end wall 2e, (ii) the upper end wall 2c, and (ii) the upper end wall 2f, so as to be movable ire the vertical direction. Hermetic sealing of the output rod 3 is achieved by (i) a sealing member 43 provided to the upper end wall 2f of the upper housing 2b, (ii) a sealing member 45 provided to the upper end wall 2c of the lower housing 2a, and (iii) a sealing member 44 attached to the lower end wall 2e of the lower housing 2a.

A hollow support rod 16 is inserted into a lower end of the output rod 3 so as to protrude downward. A suction pad 7 is fitted onto a lower part of the support rod 16. A seating part 8 is provided to a lower end of the support rod 16. The seating part 8 has a transverse groove in communication with the air discharge passage 11.

An outer circumferential surface of the output rod 3 has a clamping region A. A sleeve 4 constituted by a cylindrical collet is fitted onto the clamping region A. A tapered outer circumferential surface 12 is formed on an outer circumferential wall of the sleeve 4 so as to be narrower further downward. A slit 15 is formed in a circumferential wall of the sleeve 4 so as to extend in the vertical direction. The slit 15 allows the sleeve 4 to be elastically reduced in diameter.

An annular transmission member 5 is provided circumferentially outward of the sleeve 4. The transmission member 5 has a tapered inner circumferential surface 13 that faces the tapered outer circumferential surface 12 of the sleeve 4 from below. A plurality of balls B are inserted into an annular tapered gap formed between the tapered outer circumferential surface 12 and the tapered inner circumferential surface 13.

A locking piston 17 for pushing the transmission member 5 upward is inserted below the transmission member 5, between (i) the inner circumferential surface of the barrel part 2d of the lower housing 2a and (ii) the outer circumferential surface of the cylindrical member 46, in a hermetically sealed manner, and so as to be movable in the vertical direction. An unlocking operation chamber 18 is formed above the locking piston 17. A breathing hole 19 is in communication with the unlocking operation chamber 18. The breathing hole 19 is formed in the barrel part 2d of the lower housing 2a. A locking operation chamber 25 is formed below the locking piston 17. A supply-and-discharge passage 26 is in communication with the locking operation chamber 25. The supply-and-discharge passage 26 is formed in the barrel part 2d of the lower housing 2a.

An unlock spring 27 is provided between the transmission member 5 and the upper end wall 2c.

A cylinder hole is formed in the barrel part 2g of the upper housing 2b. A driving piston 20 is inserted into this cylinder hole in a hermetically sealed manner. The output rod 3 protrudes downward from the driving piston 20.

A retraction operation chamber 21 is formed below the driving piston 20. The retraction operation chamber 21 is in communication with a supply-and-discharge passage 22 formed in the barrel part 2g of the upper housing 2b, An advancement operation chamber 23 formed above the driving piston 20. The advancement operation chamber 23 is in communication with another supply-and-discharge passage 24 formed in the barrel part 2g.

The workpiece W is a bent plate-like member and has a positional displacement preventing hole 14. The positional displacement preventing hole 14 serves as a positional displacement preventing part, into which is inserted a positional displacement preventing pin 28 provided to the table T.

(Operation of Suction Positioning Device 1)

The suction positioning device 1 operates as follows, as illustrated in FIG. 1 and FIGS. 2A to 2D.

In a retracted unlocked state (initial state) as illustrated ire FIG. 1, compressed air is discharged from the advancement operation chamber 23 of the suction positioning device 1 through the supply-and-discharge passage 24, and compressed air is supplied to the retraction operation chamber 21 through the supply-and-discharge passage 22. This causes the driving piston 20 formed on the output rod 3 to rise and be received by the upper end wail 2f.

The suction positioning device in the initial state illustrated in FIG. 1, is moved by the robot to a position above the workpiece W illustrated in FIG. 2A. At this time, the workpiece W is on the table T and is positioned by the positional displacement preventing pin 28 and the positional displacement preventing hole 14. The suction pad 7 is separated from the workpiece W.

Compressed air is also discharged from the locking operation chamber 25 through the supply-and-discharge passage 26. This causes the locking piston 17 to be lowered by the downward biasing force of the unlock spring 27, which is transmitted via the transmission member 5, so that the locking piston 17 is received by the lower end wall 2e. The sleeve 4 is in a state where the diameter of the sleeve is expanded, due to the elastic restoring force of the sleeve 4.

When the suction positioning device 1 is driven to advance from the retracted unlocked state of FIG. 2A to the advanced unlocked state of FIG. 2B, compressed air is discharged from the retraction operation chamber 21 through the supply-and-discharge passage 22, and compressed air is supplied to the advancement operation chamber 23 through the supply-and-discharge passage 24. This causes the driving piston 20 to be lowered, such that a lip part of the suction pad 7 comes into contact with the workpiece W. A bottom surface of the seating part 8 is then received by an upper surface of the workpiece W, and the lowering operation of the output rod 3 is stopped.

Next, when the suction positioning device 1 is driven from the advanced unlocked state of FIG. 2B to the advanced locked state of FIG. 2C, compressed air is supplied from the supply-and-discharge passage 26 to the locking operation chamber 25. This causes the locking piston 17 to push the transmission member 5 upward against the downward biasing force of the unlock spring 27. This causes the tapered inner circumferential surface 13 of the transmission member 5 to push the plurality of balls B inward in a radial direction, and the plurality of balls B in turn push the tapered outer circumferential surface 12 of the sleeve 4 inward in the radial direction. As a result, the sleeve 4 is elastically deformed such that its diameter is reduced, and movement of the output rod 3 in the vertical direction is restricted (locked), so that positioning of the output rod 3 in the vertical, direction is achieved.

Thereafter, the workpiece W is suctioned via the seating part 8, by the discharging of the compressed air inside the air discharge passage 11. Next, when the arm R of the robot lifts the suction fixing device 1 that is in the advanced locked state of FIG. 2C, the workpiece W, which is suctioned and positioned by the suction positioning device 1, is lifted as illustrated in FIG. 2D. The robot then transfers the workpiece W to a location where other machining is to be carried out.

In this way, the output rod 3, which is positioned by the sleeve 4 that has been elastically deformed so as to have a reduced diameter, suctions the workpiece W by discharging the compressed air that is in the space formed between the suction pad 7 and the workpiece W, the compressed air being discharged to the outside through the air discharge passage 11 in the output rod 3.

At this time, the pressure in the air discharge passage 11 is lower than a preset pressure (threshold). The lowered pressure is detected by a pressure switch (not illustrated). In this way, it is confirmed that the workpiece W is suctioned and fixed by the suction fixing device 1.

Because the workpiece W can be positioned and suctioned by the output rod 3, it is unnecessary to separately provide (i) a suction member which is moved by a robot and (ii) a positioning pin which is movable in the vertical direction with respect to the housing. As a result, this enables a simplified configuration for the suction positioning device 1 for suctioning and positioning the workpiece W to be machined.

Furthermore, it is not necessary to provide a large number of positioning pins movable in the vertical direction with respect to the housing.

(Variation)

FIGS. 3A to 3D are diagrams for explaining the operation of a suction positioning device 1A in accordance with a variation of Embodiment 1. For convenience of description, members having the same functions as those of the members described in the above the embodiment are denoted by the same reference numerals, and descriptions thereof will not be repeated.

In the suction positioning device 1 described above, the seating part 8 that contacts the workpiece W was attached to the lower end of the support rod 16 mounted to the output rod 3. However, the present invention is not limited this configuration.

In other words, as illustrated in FIGS. 3A to 3D, the suction positioning device 1A may be configured so that (i) the seating part 8 is omitted and (ii) the workpiece W is suctioned in a manner such that only the lower end of the suction pad 7 pushes down on the workpiece W and contacts the workpiece W. This makes it possible to suction and position the workpiece W with use of an even simpler configuration.

Embodiment 2

Figure 4:
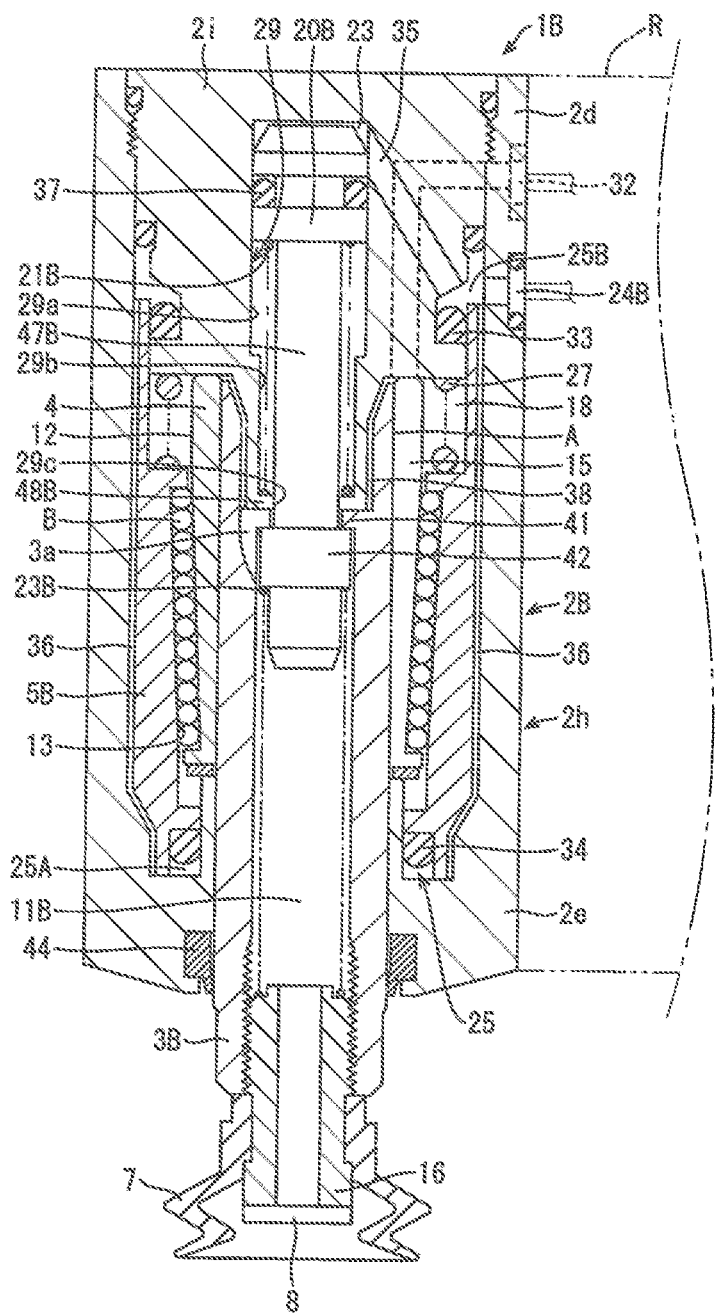
FIG. 4 is a front cross-sectional view of a suction positioning device in accordance with Embodiment 2.

The following description will discuss Embodiment 2 of the present invention with reference to FIGS. 4 to 5D. For convenience of description, members having the same functions as those of the members described in the above the embodiment are denoted by the same reference numerals, and descriptions thereof will not be repeated.

FIG. 4 is a front cross-sectional view of a suction positioning device 1B. FIGS. 5A to 5D are diagrams for explaining the operation of the suction positioning device 1B.

(Configuration of the Suction Positioning Device 1B)

The suction positioning device 1B has a housing 2B, which has a substantially cylindrical outer housing 2h and a substantially columnar inner housing 2i. The outer housing 2h has a lower end wall 2e and a barrel part 2d. The housing 2B is attached to an arm R of a robot by a plurality of fastening bolts (not illustrated).

An output rod 3B is supported by a sealing member 44 provided to the lower end wall 2e of the outer housing 2h, so as to be movable in the vertical direction in a hermetically sealed manner. The output rod 3B has an air discharge passage 11B formed in the vertical direction. The air discharge passage 11B is for suction of a workpiece W whose position is determined by the table T. The output rod 3B is connected to an air discharge mechanism (not illustrated) for discharging air in order to suction the workpiece W.

The output rod 3B has an inner circumferential step portion 41, which is structured such that a stopping part 42 of a driving piston rod 47B (described later) runs into the inner circumferential step portion 41. Part of the inner circumferential step portion has a vertical groove 3a, which is structured so that an annular gap 38 between the inner housing 2i and the output rod 3B is in communication with the air discharge passage 11B.

A hollow support rod 16 is inserted into a lower end of the output rod 3B so as to protrude downward. A suction pad 7 is fitted onto a lower part of the support rod 16. A seating part 8 is provided to a lower end of the support rod 16.

An outer circumferential surface of the output rod 3B has a clamping region A. A sleeve 4 constituted by a cylindrical collet is fitted onto the clamping region A. A tapered outer circumferential surface 12 is formed on an outer circumferential wall of the sleeve 4 so as to be narrower further downward. A slit 15 is formed in a circumferential wall of the sleeve 4 so as to extend in the vertical direction. The slit 15 allows the sleeve 4 to be elastically reduced in diameter.

An annular transmission member 5B is provided circumferentially outward of the sleeve 4. The transmission member 5B has a tapered inner circumferential surface 13 that faces the tapered outer circumferential surface 12 of the sleeve 4 from below plurality of balls B are inserted into an annular tapered gap formed between the tapered outer circumferential surface 12 and the tapered inner circumferential surface 13.

The inner housing 2i is inserted into the outer housing 2h from above in a hermetically sealed manner.

The transmission member 5B is supported by a sealing member 33 provided to the outer peripheral surface of the inner housing 2i, so as to be movable in the vertical direction in a hermetically sealed manner. The transmission member 5B is also supported by a sealing member 34 provided to the outer circumferential surface of the lower end wall 2e of the outer housing 2h, so as to be movable in the vertical direction in a hermetically sealed manner.

An unlocking operation chamber 18 is formed between the transmission member 5B and the inner housing 2i. The unlocking operation chamber 18 is in communication with the air discharge passage 11B via (i) the slit 15, (ii) the annular gap 38 between the inner housing 2i and the output rod 3B, and (iii) the vertical groove 3a. A discharge passage 32 is in communication with the unlocking operation chamber 18. The discharge passage 32 is formed in the outer housing 2h and the inner housing 2i of the housing 2B.

Air for suction is discharged by passing through the air discharge passage 11B, the vertical groove 3a, the annular gap 38, the slit 15, the unlocking operation chamber 18, and the discharge passage 32.

An unlock spring 27 is provided between the transmission member 5B and the inner housing 2i.

The inner housing 2i has a piston hole 29 whose opening faces downward. The piston hole 29 has a small-diameter hole 29c, a medium-diameter hole 29b, and a large-diameter hole 29a, which are formed so as to be in this order from bottom to top. The driving piston rod 47B protrudes downward from the driving piston 20B, which is supported in a hermetically sealed manner by a sealing member 37 provided to the inner circumferential surface of the large-diameter hole 29a. The driving piston rod 47B is inserted into the air discharge passage 11B of the output rod 3B so as to pass through the small-diameter hole 29c and the medium-diameter hole 29b. The stopping part 42, which is provided to a lower part of the driving piston rod 47B, comes into contact with the inner circumferential step portion 41 of the output rod 3B from below.

An advancement operation chamber 23 is formed above the driving piston 20B. The advancement operation chamber 23 is in communication, via a diagonal passage 35, with a locking supply-and-discharge passage 24B formed in the barrel part 2d of the outer housing 2h.

An advancement operation spring 23B is provided between the stopping part 42 of the driving piston rod 47B and the support rod 16. A retraction operation spring 21B is provided between a top surface of the inner circumferential step portion 48B of the inner housing 2i and a bottom surface of the driving piston 20B. The inner circumferential step portion 41 of the output rod 3B is located between (i) the inner circumferential step portion 48B forming the small-diameter hole 29c of the inner housing 2i and (ii) the stopping part 42 of the driving piston rod 47B.

A locking operation chamber 25 for raising the transmission member 5B is formed between the transmission member 5B and the housing 2. The locking operation chamber 25 includes: a lower operation chamber 25A formed between the lower end wall 2e of the outer housing 2h and the transmission member 5B; an upper operation chamber 25B which is (i) formed between the inner housing 2i, the barrel part 2d of the outer housing 2h, and the transmission member 5B and (ii) in communication with the locking supply-and-discharge passage 24B and the diagonal passage 35; and a restricting passage 36 formed in the outer circumferential surface of the transmission member 5B so put the lower operation chamber 25A and the upper operation chamber 25B in communication with each other, in order to provide a restricting mechanism between the lower operation chamber 25A and the upper operation chamber 25B. The shape of the restricting passage 36 is not particularly limited. The restricting passage 36 may be formed in a straight line along the vertical direction. The restricting passage 36 may be formed in a spiral shape. Further, the number of restricting passages 36 is not particularly limited. A single restricting passage 36 may be formed, or a plurality of restricting passages 36 may be formed.

(Operation of Suction Positioning Device 1B)

The suction positioning device 1B operates as follows, as illustrated in FIG. 4 and FIGS. 5A to 5D.

In the retracted unlocked state (initial state) of FIG. 4, compressed air is discharged from the advancement operation chamber 23 of the suction positioning device 1B through the diagonal passage 35 and the locking supply-and-discharge passage 24B. This causes the driving piston 20B to be raised by the biasing force of the retraction operation spring 21B, and the stopping part 42 of the driving piston rod 47B is received by the inner housing 2i via the inner circumferential step portion 41 of the output rod 3B.

The suction positioning device 1B, in the initial state illustrated in FIG. 4, is moved by the robot to a position above the workpiece W illustrated in FIG. 5A. At this time, the workpiece W is on the table T and is positioned by the positional displacement preventing pin 28 and the positional displacement preventing hole 14. The suction pad 7 is separated from the workpiece W.

Compressed air in the locking operation chamber 25 is discharged to the outside through the locking supply-and-discharge passage 24B. This causes the transmission member 5B to be lowered by the downward biasing force of the unlock spring 27, so as to be received by the lower end wall 2e. The sleeve 4 is in a state where the diameter of the sleeve is expanded, due to the elastic restoring force of the sleeve 4.

When the suction positioning device 1B is driven to advance from the retracted unlocked state of FIG. 5A to the advanced unlocked state of FIG. 5B, compressed air is supplied to the upper operation chamber 25B of the locking operation chamber 25 through the locking supply-and-discharge passage 24B. Then, the compressed air in the upper operation chamber 25B is supplied to the advancement operation chamber 23 through the diagonal passage 35, and, at the same time, is slowly supplied to the lower operation chamber 25A through the restricting passage 36 which acts as a restricting mechanism. This causes pressure in the advancement operation chamber 23 to rise before pressure in the lower operation chamber 25A. The driving piston 20B is lowered against the retraction operation spring 21B, and, at the same time, the advancement operation spring 23B pushes the support rod 16 downward to so as to lower the output rod 3B. This causes a lip part of the suction pad 7 to come into contact with the workpiece W. A bottom surface of the seating part 8 is then received by an upper surface of the workpiece W, and the lowering operation of the output rod 3B is stopped, as illustrated in FIG. 5B.

Next, when the suction positioning device 1B undergoes a locking operation so as to transition from the advanced unlocked state of FIG. 5B to the advanced locked state of FIG. 5C, first, compressed air is discharged from the unlocking operation chamber 18 through the discharge passage 32.

Then, when the compressed air supplied to the upper operation chamber 25B through the locking supply-and-discharge passage 24 is supplied to the lower operation chamber 25A through the restricting passage 36 and the pressure of the lower operation chamber 25A rises sufficiently, an upward force acts on a large-area annular pressure-receiving surface formed at the lower end of the transmission member 5B, and a downward force acts on a small-area annular pressure-receiving surface formed at the upper end of the transmission member 5B. The difference between these upward and downward forces causes the transmission member 5B to rise, as illustrated in FIG. 5C.

This causes the tapered inner circumferential surface 13 of the transmission member 5B to push the plurality of balls B inward in a radial direction, and the plurality of balls B in turn push the tapered outer circumferential surface 12 of the sleeve 4 inward in the radial direction. As a result, the sleeve 4 is elastically deformed such that its diameter is reduced, and movement of the output rod 3B in the vertical direction is restricted (locked), so that positioning of the output rod 3B in the vertical direction is achieved.

Air in the air discharge passage 11B is discharged through the vertical groove 3a, the annular gap 38, the slit 15, the unlocking operation chamber 18, and the discharge passage 32. This causes the suction pad 7 to suction the workpiece W through the seating part 8. Next, as illustrated in FIG. 5D, when the arm R of the robot to which the housing 2B is attached is moved upward, the workpiece W, which is suctioned and positioned by the suction positioning device 1B, is lifted. The robot then transfers the workpiece W to a location where other machining is to be carried out.

In the above example, the compressed air supplied to the upper operation chamber 25B through the locking supply-and-discharge passage 24B was supplied to the advancement operation chamber 23 through the diagonal passage 35. Note, however, that the present invention is not limited to this configuration. For example, the compressed air may be directly supplied from the locking supply-and-discharge passage 24B to the advancement operation chamber 23, and the compressed air supplied to the advancement operation chamber 23 may be supplied to the upper operation chamber 25B through the diagonal passage 35. Alternatively, compressed air may be supplied from the locking supply-and-discharge passage 24B and through the diagonal passage 35 to both the upper operation chamber 25B and the advancement operation chamber 23.

In the above example, the restricting passage 36 was formed in the outer circumferential surface of the transmission member 5B. Note, however, that the present invention is not limited to this configuration. For example, the restricting passage 36 may be formed in the inner circumferential surface of the outer housing 2h.

Embodiment 3

Figure 6:
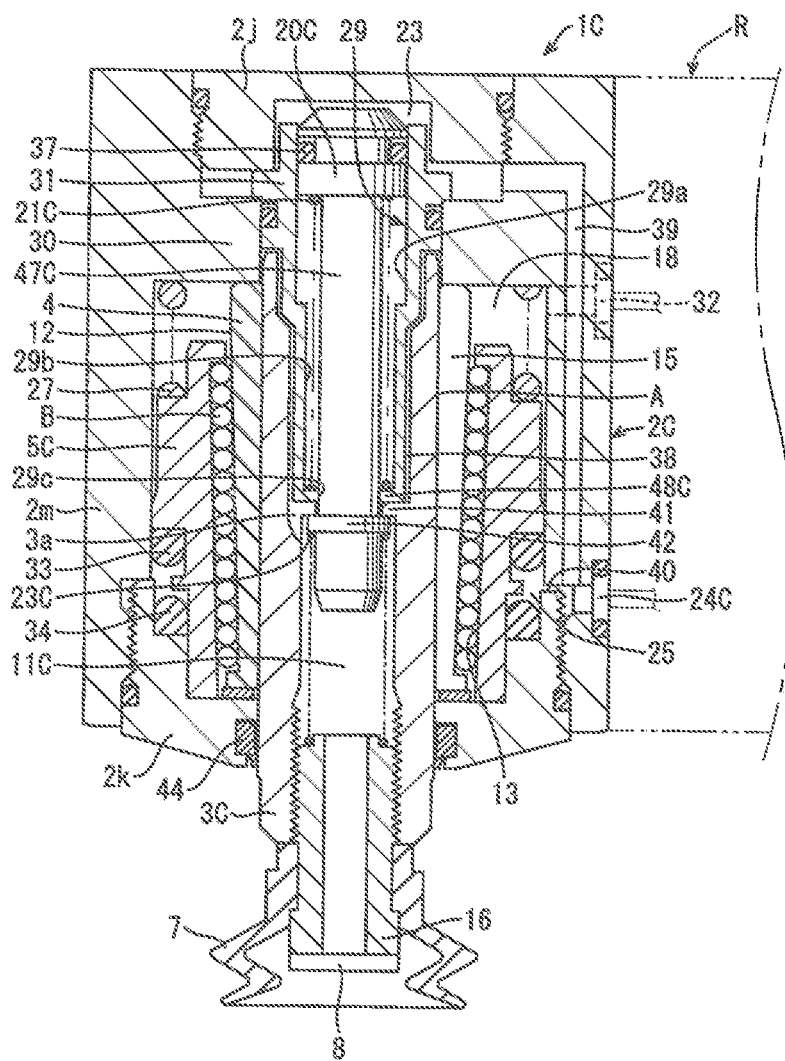
FIG. 6 is a front cross-sectional view of a suction positioning device in accordance with Embodiment 3.

The following description will discuss Embodiment 3 of the present invention with reference to FIGS. 6 to 7D. For convenience of description, members having the same functions as those of the members described in the above the embodiment are denoted by the same reference numerals, and descriptions thereof will not be repeated.

FIG. 6 is a front cross-sectional view of a suction positioning device 1C. FIG. 7A to FIG. 7D are front cross-sectional views of the suction positioning device 1C, and are for explaining the operation thereof.

(Configuration of the Suction Positioning Device 1C)

A housing 2C of the suction positioning device 1C has an upper end wall 2j, a lower end wall 2k, and a barrel part 2m. The housing 2C is attached to an arm R of a robot by a plurality of fastening bolts (not illustrated).

An output rod 3C is supported by a sealing member 44 provided to the lower end wall 2k of the housing 2C, so as to be movable in the vertical direction in a hermetically sealed manner. The output rod 3C has an air discharge passage 11C formed in the vertical direction. The air discharge passage 11C is for suction of a workpiece W whose position is determined by the table T. The output rod 3C is connected to an air discharge mechanism (not illustrated) for discharging air in order to suction the workpiece W.

A hollow support rod 16 is inserted into a lower end of the output rod 3C so as to protrude downward. A suction pad 7 is fitted onto a lower part of the support rod 16. A seating part 8 is provided to a lower end of the support rod 16. The output rod 3C has an inner circumferential step portion 41, which is structured such that a stopping part 42 of a driving piston rod 47C (described later) runs into the inner circumferential step portion 41. Part of the inner circumferential step portion has a vertical groove 3a, which is structured so that an annular gap 38 between a cylindrical member 31 and the output rod 3C is in communication with the air discharge passage 11C.

An outer circumferential surface of the output rod 3C has a clamping region A. A sleeve 4 constituted by a cylindrical collet is fitted onto the clamping region A. A tapered outer circumferential surface 12 is formed on an outer circumferential wall of the sleeve 4 so as to be narrower further downward. A slit 15 is formed in a circumferential wall of the sleeve 4 so as to extend in the vertical direction. The slit 15 allows the sleeve 4 to be elastically reduced in diameter.

An annular transmission member 5C is provided circumferentially outward of the sleeve 4. The transmission member 5C has a tapered inner circumferential surface 13 that faces the tapered outer circumferential surface 12 of the sleeve 4 from below. A plurality of balls B are inserted into an annular tapered gap formed between the tapered outer circumferential surface 12 and the tapered inner circumferential surface 13.

The transmission member 5C is supported by a sealing member 33 provided to the inner circumferential surface of the barrel part 2m of the housing 2C, so as to be movable in the vertical direction in a hermetically sealed manner. The transmission member 5C is also supported by a sealing member 34 provided to the inner circumferential surface of the lower end wall 2k, so as to be movable in the vertical direction in a hermetically sealed manner. An unlocking operation chamber 18 is formed between an inner circumferential step portion 30 and the transmission member 5C. The inner circumferential step portion 30 projects inward in a radial direction from the inner circumferential surface of the barrel part 2m of the housing 2C. A discharge passage 32 is in communication with the unlocking operation chamber 18. The discharge passage 32 is formed in the barrel part 2m of the housing 2C.

An unlock spring 27 is provided between the inner circumferential step portion 30 and the transmission member 5C.

The cylindrical member 31 is inserted into the output rod 3C. An inner circumferential step portion 48C is provided at the lower end of the cylindrical member 31. A retraction operation spring 21C is provided between an upper surface of the inner circumferential step portion 48C and a lower surface of a driving piston 20C.

The cylindrical member 31 has a piston hole 29 whose openings face upward and downward. The piston hole 29 has a small-diameter hole 29c, a medium-diameter hole 29b, and a large-diameter hole 29a, which are formed so as to be in this order from bottom to top. The driving piston rod 47C protrudes downward from the driving piston 20C, which is supported in a hermetically sealed manner by a sealing member 37 provided to the inner circumferential surface of the large-diameter hole 29a. The driving piston rod 47C is inserted into the air discharge passage 11C of the output rod 3C so as to pass through a medium-diameter hole 29b and a small-diameter hole 29c.

The unlocking operation chamber 18 is in communication with the air discharge passage 11C via (i) the slit 15, (ii) the annular gap 38 between the cylindrical member 31 and the output rod 3C, and (iii) the vertical groove 3a.

An advancement operation chamber 23 is formed above the driving piston 20C. The advancement operation chamber 23 is in communication, via a communication passage 39 formed in the barrel part 2m of the housing 2C, with a locking supply-and-discharge passage 24C formed in the barrel part 2m.

A locking operation chamber 25 for raising the transmission member 5C is formed between the transmission member 5C, the lower end wall 2k, and the barrel part 2m. In order to provide a restricting mechanism between the locking operation chamber 25 and the locking supply-and-discharge passage 24C, a restricting passage 40 is formed between the lower end wall 2k and the barrel part 2m such that the locking operation chamber 25 and the locking supply-and-discharge passage 24C are in communication with each other.

An advancement operation spring 23C is provided between the stopping part 42 of the driving piston rod 47C and the support rod 16. The inner circumferential step portion 41 of the output rod 3C is located between (i) the inner circumferential step portion 48C forming the small-diameter hole 29c of the cylindrical member 31 and (ii) the stopping part 42 of the driving piston rod 47C.

(Operation of Suction Positioning Device 1C)

The suction positioning device 1C operates as follows, as illustrated in FIG. 6 and FIGS. 7A to 7D.

In the retracted unlocked state (initial state) of FIG. 6, air is discharged from the advancement operation chamber 23 of the suction positioning device 1C through the communication passage 39 and the locking supply-and-discharge passage 24C. This causes the driving piston 20C inserted in the output rod 3C to be raised by the biasing force of the retraction operation spring 21C, and the stopping part 42 of the driving piston rod 47C is received by (i) the inner circumferential step portion 41 of the output rod 3C and (ii) the cylindrical member 31.

The suction positioning device 1C, in the initial state illustrated in FIG. 6 is moved by the robot to a position above the workpiece W illustrated in FIG. 7A. At this time, the workpiece W is on the table T and is positioned by the positional displacement preventing pin 28 and the positional displacement preventing hole 14. The suction pad 7 is separated from the workpiece W.

Compressed air is discharged from the locking operation chamber 25 through the locking supply-and-discharge passage 24C. This causes the transmission member 5C to be lowered by the downward biasing force of the unlock spring 27, so as to be received by the lower end wall 2k. The sleeve 4 is in a state where the diameter of the sleeve is expanded, due to the elastic restoring force of the sleeve 4.

When the suction positioning device 1C is driven to advance from the retracted unlocked state of FIG. 7A to the advanced unlocked state of FIG. 7B, compressed air is supplied to the advancement operation chamber 23 through the locking supply-and-discharge passage 24C and the communication passage 39. Compressed air is slowly supplied to the locking operation chamber 25 through the locking supply-and-discharge passage 24C and the restricting passage 40. This causes pressure in the advancement operation chamber 23 to rise before pressure in the locking operation chamber 25, which is provided with the restricting passage 40 as a restricting mechanism. The driving piston 20C is lowered against the retraction operation spring 21C, and, at the same time, the advancement operation spring 23C pushes the support rod 16 downward to so as to lower the output rod 3C. This causes a lip part of the suction pad 7 to come into contact with the workpiece W. A bottom surface of the seating part 8 is then received by an upper surface of the workpiece W, and the lowering operation of the output rod 3C is stopped, as illustrated in FIG. 7B.

Next, when the suction positioning device 1C undergoes a locking operation so as to transition from the advanced unlocked state of FIG. 7B to the advanced locked state of FIG. 7C, first, compressed air is discharged from the unlocking operation chamber 18 through the discharge passage 32.

Then, when the pressure of the compressed air supplied from the locking supply-and-discharge passage 24C to the locking operation chamber 25 through the restricting passage 40 has risen sufficiently, an upward force acts on an annular pressure-receiving surface formed on the lower side of the transmission member 5C, such that the transmission member 5C rises against the unlock spring 27, as shown in FIG. 7C.

This causes the tapered inner circumferential surface 13 of the transmission member 5C to push the plurality of balls B inward in a radial direction, and the plurality of balls B in turn push the tapered outer circumferential surface 12 of the sleeve 4 inward in the radial direction. As a result, the sleeve 4 is elastically deformed such that its diameter is reduced, and movement of the output rod 3C in the vertical direction is restricted (locked), so that positioning of the output rod 3C in the vertical direction is achieved.

Air in the air discharge passage 11C is discharged through the vertical groove 3a, the annular gap 38, the slit 15, the unlocking operation chamber 18, and the discharge passage 32. This causes the suction pad 7 to suction the workpiece W through the seating part 8. Next, as illustrated in FIG. 7D, when the arm R of the robot to which the housing 2C is attached is moved upward, the workpiece W, which is suctioned and positioned by the suction positioning device 1C, is lifted. The robot then transfers the workpiece W to a location where other machining is to be carried out.

The above embodiments can be modified as follows.

The cylindrical collet (the sleeve 4) may have a plurality of slits instead of only the one slit 15 as exemplarily described above. Further, the collet may be constituted by a divided member instead of the integrally formed member as exemplarily described above. In such a case, the reduction in diameter of the divided member may be released by the elastic restoring force of the divided member, or the reduction in diameter of the divided member may be released by a separately provided diameter-increasing spring.

For a means for causing e.g. the output rod 3 to advance downward, instead of using the exemplarily described advancement operation springs 23B and 23C, an elastic member such as rubber may be used, or, e.g. a compressed fluid may be used. For a means for retracting the driving pistons 20B and 20C upward, instead of using the exemplarily described retraction operation springs 21B and 21C, an elastic body such as rubber may be used, or e.g. a compressed fluid may be used.

For intermediate members in an annular tapered gap between the tapered outer circumferential surface 12 and the tapered inner circumferential surface 13, instead of using the exemplarily described plurality of balls B, a cylindrical member having a low-friction function may be used instead.

For a mechanism relating to the intermediate member in the annular tapered gap formed between the tapered outer circumferential surface 12 and the tapered inner circumferential surface 13, instead of using the exemplarily described plurality of balls B and a tapered transmission mechanism using a cylindrical collet as described above, a mechanism may be used in which (i) an annular operation chamber is formed around the outer circumference of a thin sleeve, and (ii) fluid pressure causes the thin sleeve to be reduced in diameter so as to lock e.g. the output rod 3.

For the pressurized fluid supplied to the advancement operation chamber 23, the retraction operation chamber 21, the locking operation chamber 25, and the unlocking operation chamber 18, instead of using a gas such as compressed air, a fluid such as pressurized oil may be used.

The suction positioning device 1 can be provided so that the axial center of e.g. the output rod 3 extends in a horizontal direction or an oblique direction, instead of the vertical direction.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: suction positioning device, 2: housing, 3: output rod, 4: sleeve, 5: transmission member, 7: suction pad, 8: seating part, 11: air discharge passage, 12: tapered outer circumferential surface, 13: tapered inner circumferential surface, 14: positional displacement preventing hole (positional displacement preventing part), 17: locking piston (driving member), B: balls, W: workpiece

The invention claimed is:
1. A suction positioning structure comprising:
an output rod (3, 3B, 3C) which is movable in an axis direction, the output rod (3, 3B, 3C) having an air discharge passage (11, 11B, 11C), provided so as to extend in the axis direction, for suctioning a workpiece (W) to be machined, a suction pad (7) being attached to the output rod (3, 3B, 3C) so as to communicate with the air discharge passage (11, 11B, 11C);
a sleeve (4) fitted onto the output rod (3, 3B, 3C), which sleeve (4) has a tapered outer circumferential surface (12) and is elastically deformable so as to have a reduced diameter;
a transmission member (5) which has a tapered inner circumferential surface (13) that faces the tapered outer circumferential surface (12) of the sleeve (4);
a plurality of balls (B) inserted between the tapered inner circumferential surface (13) and the tapered outer circumferential surface (12); and
a driving member (17) which moves the transmission member (5) in the axis direction, so as to elastically deform the sleeve (4) via the plurality of balls (B) such that the sleeve (4) has a reduced diameter;
a first supply-and-discharge passage (24) in communication with an advancement operation chamber (23) for moving the output rod (3, 3B, 3C) in the axis direction; and
a second supply-and-discharge passage (26) in communication with a locking operation chamber (25) for moving the transmission member (5) in the axis direction,
wherein the first supply-and-discharge passage (24) and the second supply-and-discharge passage (26) are provided independently without being in communication with each other so that movement of the output rod (3, 3B, 3C) and movement of the transmission member (5) are separately controllable.
2. The suction positioning structure according to claim 1, further comprising:
a seating part (8) which is attached to a side, closer to the workpiece (W), of the air discharge passage (11, 11B, 11C) of the output rod (3, 3B, 3C) so as to be able to come into contact with the workpiece (W).
3. A suction positioning device (1, 1A, 1B, 1C) comprising:
the suction positioning structure according to claim 1;
a housing (2, 2B, 2C) which supports the output rod such that the output rod is movable in the axis direction, the housing (2, 2B, 2C) being provided for attachment of the suction positioning device to an arm of a robot; and
the suction pad (7) for suctioning the workpiece W, which suction pad (7) is attached to the output rod (3, 3B, 3C) so as to communicate with the air discharge passage (11, 11B, 11C).
4. The suction positioning device (1, 1A, 1B, 1C) according to claim 3, wherein
the workpiece (W) is a plate-like member to be machined, and
the workpiece (W) has a positional displacement preventing part (14) for preventing the workpiece (W) from being positionally displaced, the suction positioning device (1, 1A, 1B, 1C) further comprises a table (T) on which the work (W) is placed, and the table (T) includes, at a position corresponding to the positional displacement preventing part (14), a positional displacement preventing fitting section (28) which fits the positional displacement preventing part (14).

5. A suction positioning device (1, 1A, 1B, 1C) comprising:

the suction positioning structure according to claim 2;

a housing (2, 2B, 2C) which supports the output rod such that the output rod is movable in the axis direction, the housing (2, 2B, 2C) being provided for attachment of the suction positioning device to an arm of a robot; and the suction pad (7) for suctioning the workpiece W, which suction pad (7) is attached to the output rod (3, 3B, 3C) so as to communicate with the air discharge passage (11, 11B, 11C).

6. The suction positioning device (1, 1A, 1B, 1C) according to claim 5, wherein the workpiece (W) is a plate-like member to be machined, the workpiece (W) has a positional displacement preventing part (14) for preventing the workpiece (W) from being positionally displaced, the suction positioning device (1, 1A, 1B, 1C) further comprises a table (T) on which the work (W) is placed, and the table (T) includes, at a position corresponding to the positional displacement preventing part (14), a positional displacement preventing fitting section (28) which fits the positional displacement preventing part (14).

7. A suction positioning structure comprising:

an output rod (3, 3B, 3C) which is movable in an axis direction, the output rod (3, 3B, 3C) having an air discharge passage (11, 11B, 11C), provided so as to extend in the axis direction, for suctioning a workpiece (W) to be machined, a suction pad (7) being attached to the output rod (3, 3B, 3C) so as to communicate with the air discharge passage (11, 11B, 11C);

a sleeve (4) fitted onto the output rod (3, 3B, 3C), which sleeve (4) has a tapered outer circumferential surface (12) and is elastically deformable so as to have a reduced diameter;

a transmission member (5B, 5C) which has a tapered inner circumferential surface (13) that faces the tapered outer circumferential surface (12) of the sleeve (4);

a plurality of balls (B) inserted between the tapered inner circumferential surface (13) and the tapered outer circumferential surface (12);

a first supply-and-discharge passage (24) in communication with an advancement operation chamber (23) for moving the output rod (3, 3B, 3C) in the axis direction; and a second supply-and-discharge passage (26) in communication with a locking operation chamber (25) into which compressed air is supplied, the compressed air acting on an annular pressure-receiving surface of the transmission member (5B, 5C) so as to move the transmission member (5B, 5C) in the axis direction, wherein the first supply-and-discharge passage (24) and the second supply-and-discharge passage (26) are provided independently without being in communication with each other so that movement of the output rod (3, 3B, 3C) and movement of the transmission member (5) are separately controllable.

8. The suction positioning structure according to claim 7, further comprising:

a seating part (8) which is attached to a side, closer to the workpiece (W), of the air discharge passage (11, 11B, 11C) of the output rod (3, 3B, 3C) so as to be able to come into contact with the workpiece (W).

9. A suction positioning device (1, 1A, 1B, 1C) comprising:

the suction positioning structure according to claim 7;

a housing (2, 2B, 2C) which supports the output rod such that the output rod is movable in the axis direction, the housing (2, 2B, 2C) being provided for attachment of the suction positioning device to an arm of a robot; and the suction pad (7) for suctioning the workpiece W, which suction pad (7) is attached to the output rod (3, 3B, 3C) so as to communicate with the air discharge passage (11, 11B, 11C).

10. The suction positioning device (1, 1A, 1B, 1C) according to claim 9, wherein the workpiece (W) is a plate-like member to be machined, the workpiece (W) has a positional displacement preventing part (14) for preventing the workpiece (W) from being positionally displaced, the suction positioning device (1, 1A, 1B, 1C) further comprises a table (T) on which the work (W) is placed, and the table (T) includes, at a position corresponding to the positional displacement preventing part (14), a positional displacement preventing fitting section (28) which fits the positional displacement preventing part (14).

* * * * *